(12) United States Patent
Basset et al.

(10) Patent No.: US 7,393,454 B2
(45) Date of Patent: Jul. 1, 2008

(54) ELIMINATION OF METAL IONS FROM AQUEOUS EFFLUENTS

(75) Inventors: Jean-Marie Basset, Caluire (FR); Jean-Pierre Candy, Caluire (FR); Gregory Dard, Genilac (FR)

(73) Assignee: Centre National de la Recherche Scientifique (C.N.R.S), Paris (FR)

( * ) Notice: Subject to any disclaimer, the term of this patent is extended or adjusted under 35 U.S.C. 154(b) by 0 days.

(21) Appl. No.: 10/471,843

(22) PCT Filed: Mar. 12, 2002

(86) PCT No.: PCT/FR02/00879

§ 371 (c)(1),
(2), (4) Date: Sep. 15, 2003

(87) PCT Pub. No.: WO02/072483

PCT Pub. Date: Sep. 19, 2002

(65) Prior Publication Data

US 2004/0074844 A1    Apr. 22, 2004

(30) Foreign Application Priority Data

Mar. 13, 2001   (FR) .................................. 01/03428

(51) Int. Cl.
*C02F 1/28* (2006.01)

(52) U.S. Cl. .................. 210/668; 210/679; 210/688; 210/757; 210/912

(58) Field of Classification Search .............. 210/668, 210/679, 688, 719, 757, 912, 913; 75/724–738
See application file for complete search history

(56) References Cited

U.S. PATENT DOCUMENTS

| | | | | |
|---|---|---|---|---|
| 2,905,323 A | * | 9/1959 | Megesi | 210/130 |
| 3,802,910 A | * | 4/1974 | Gerow et al. | 75/389 |
| 3,840,365 A | * | 10/1974 | Hammes et al. | 75/399 |
| 3,909,244 A | * | 9/1975 | Rose et al. | 75/498 |
| 4,028,236 A | * | 6/1977 | Townsend et al. | 75/724 |
| 4,152,143 A | * | 5/1979 | Kausel et al. | 75/730 |
| 5,082,492 A | * | 1/1992 | Gallup et al. | 75/712 |
| 5,169,538 A | * | 12/1992 | Habermann et al. | 210/709 |
| 5,531,901 A | * | 7/1996 | Miyabe et al. | 210/668 |
| 5,647,991 A | | 7/1997 | Smith | 210/662 |

FOREIGN PATENT DOCUMENTS

| | | | |
|---|---|---|---|
| EP | 0 364 188 | | 4/1990 |
| WO | WO 93/10049 | * | 5/1993 |
| WO | 98 16476 | | 4/1998 |

OTHER PUBLICATIONS

Translation of PCT document WO 93/10049.*
E. Smith, "Uptake of Heavy Metals in Batch Systems By a Recycled Iron-Bearing Material," Water Research, Elsevier Science Publishers, Amsterdam, NL, vol. 30, No. 10, Oct. 1, 1996, pp. 2424-2434, XP000638988 ISSN: 0043-1354.

* cited by examiner

*Primary Examiner*—Christopher Upton
(74) *Attorney, Agent, or Firm*—Young & Thompson

(57) ABSTRACT

Method for the elimination of metal ions from aqueous media, such as zinc, lead, chrome, copper, iron, aluminium, manganese, cadmium, cerium or silver and mixtures of the metals present in a trace or ultratrace state in aqueous effluents, by adsorption on a solid charge containing a metal chosen from group VIII.

20 Claims, No Drawings

ELIMINATION OF METAL IONS FROM AQUEOUS EFFLUENTS

CROSS REFERENCE TO RELATED APPLICATION

This is the 35 USC 371 national stage of international application PCT/FR02/00879 filed on Mar. 12, 2002, which designated the United States of America.

FIELD OF THE INVENTION

The present invention relates to a novel process which makes possible the removal of metals, such as, but without implied limitation, zinc, lead, chromium, copper, iron, aluminum, manganese, cadmium, cerium or silver, in solution in the ionic form in water or any medium possessing an aqueous nature, by chemisorption on a solid charge which is readily extracted from the aqueous phase and which comprises a metal, preferably a reduced metal, preferably selected from the metals from Group VIII (Ni, Co, Fe, Cu, Pt, Pd, Rh, Ir, and the like).

BACKGROUND OF THE INVENTION

The risks incurred by the population when metals in the form of traces are found in aqueous discharge liquors from chemical, petrochemical, agrochemical, pharmaceutical, plastic or metallurgical plants, and the like, are now known. Mention may be made, for example, of diseases which can result from the ingestion by man of traces of lead (saturnism), of cadmium (proteinuria, itai-itai in Japan), of aluminum (Elsheimer), of mercury (Minamata disease in Japan), of chromium (VI) (cancer), and the like.

It is therefore advantageous to find methods which make it possible to remove these metals in the trace and ultratrace form in wastewater and generally in water. Legislation, in particular European legislation, is particularly strict and gives increasingly lower values for metal contents. For example, the tolerated contents in aqueous industrial discharges are all less than 1 ppm and, in drinking water, this content must not exceed 50 ppb for lead or chromium and 5 ppb for cadmium and must be less than 1 ppb for mercury.

Current processes for removing metals from aqueous effluents involve precipitation in the form of hydroxides or of sulfides, coprecipitation with aluminum, iron or other salts, adsorption on inorganic or organic charges, or ion exchange.

These processes involve physisorption methods or ion exchange methods and relate only to one type of ion and, furthermore, are reversible.

Finally, these processes are generally ineffective for the removal of contaminants present in the form of traces, for example of the order of 1.1 000 to 10 000 ppm.

Thus, there exists a demand for an efficient method for removing metal contaminants present in the form of traces in aqueous effluents.

SUMMARY OF THE INVENTION

A subject matter of the present invention is a novel method which makes it possible to remove a metal in the ionic form in solution of water in the trace or ultratrace form.

The claimed method involves chemisorption by a solid charge, at least one of the constituents of which is a reduced metal. This metal preferably belongs to the metals from Group VIII of the Periodic Table and more preferably relates to metals such as nickel, palladium, platinum, iron or cobalt.

The reduced metal can be in a colloidal form or on a support.

When these metals are present on a solid support, they can be found alone or as a mixture, such as Ni and Pt, in the alloy or nonalloy state.

The metal from Group VIII can also be prepared by the Raney method, that is to say from a powder of an alloy of this metal with aluminum, extraction of the aluminum by a strong base in solution in water, washing under hot conditions, filtration and storage of the powder obtained in a slightly basic aqueous medium under a neutral atmosphere. Among the metals from Group VIII, nickel in the Raney form is commercially available; it can be used directly.

The metal from Group VIII can be deposited on a support, preferably a divided support, composed of an oxide or of a combination of oxides of metals from Group IIA, IIIA, IVA or IVB of the Periodic Table, such as aluminum, silicon or titanium. Use may also be made of active charcoal, zeolites, alumina, $TiO_2$, mesoporous solids, such as MCM41, molecular sieves or their mixtures.

The metal from Group VIII is deposited on the support by impregnation or exchange starting from its inorganic salts or from molecular complexes. The salts deposited are decomposed by treatment under a stream of a reducing, oxidizing or neutral gas at a temperature of between 100 and 600° C. Prior to its use in the claimed process, the metal from Group VIII deposited on a support is reduced using a chemical reducing agent or with hydrogen between 100 and 600° C.

According to a preferred alternative form of the invention, the metal from Group VIII is brought into contact in the reduced state with the aqueous solution comprising the traces of metals to be removed. The reduction of the supported metal is preferable for a better action of the process but it is not essential as the charge to be treated may possibly comprise a reducing component, such as traces of hydrazine, of sodium or potassium borohydride or of borohydrides of other cations, or of other chemical reducing agents, such as formic acid or formaldehyde.

DETAILED DESCRIPTION OF THE INVENTION

The process consists in passing the aqueous charge to be treated over a solid comprising the metal on which the traces of metal will be chemisorbed. The term "chemisorption", which indeed characterizes the present invention, is understood to mean the creation of a specific chemical bond between the metal to be removed and the supported metal. It is not an adsorption, which is a generally equilibrated phenomenon which does not make it possible to achieve the very low levels of metals in water which constitute the spectacular result of the present invention. However, the chemisorption process can be improved if the support of the metal itself has a high specific surface which makes possible a first adsorption of the large amounts of metal ions which may be present in the solution before completing the process by chemisorption on the reduced metal.

The temperature of the process can vary but it can be between 0 and 200° C. and preferably between 0 and 80° C. It may happen that higher temperatures are necessary, in which case carrying out the reaction under pressure is possible.

It is also possible, but this is not always necessary, to carry out the chemisorption under hydrogen, which makes it possible to maintain a better state of reduction of the system. The hydrogen pressure can vary from 0 to 10 atmospheres and preferably between 0 and 1 atmosphere.

The following examples illustrate the invention without limiting the scope thereof.

EXAMPLE 1

10 g of an aqueous solution comprising an amount of cadmium salt ($CdCl_2$) to be removed corresponding to 3800 ppm (weight of cadmium per weight of solution) are brought into contact with an amount of Raney nickel (Acros) corresponding to 0.1 g/g of solution.

After reacting for 5 hours, the solid is removed from the solution by filtration.

The final concentration of $Cd^{++}$ in the solution is then only 4 ppm (weight of cadmium per weight of solution). The catalytic solid has therefore virtually completely removed the cadmium from the aqueous solution.

EXAMPLE 2

10 g of an aqueous solution comprising an amount of cadmium salt ($CdCl_2$) to be removed corresponding to 1000 ppm (weight of cadmium per weight of solution) are brought into contact with 1 g of a solid composed of nickel supported on alumina comprising 23% (by weight) of nickel.

After reacting for 24 hours, the solid is removed from the solution by filtration.

The final concentration of $Cd^{++}$ in the solution is then less than 3 ppm (weight of cadmium per weight of solution).

EXAMPLE 3

10 g of an aqueous solution comprising an amount of cobalt salt ($CoCl_2$) to be removed corresponding to 2000 ppm (weight of cobalt per weight of solution) are brought into contact with a amount of Raney nickel (Acros) corresponding to 0.1 g/g of solution.

After reacting for 24 hours, the solid is removed from the solution by filtration.

The final concentration of $Co^{++}$ in the solution is then only 4 ppm (weight of cobalt per weight of solution).

EXAMPLE 4

10 g of an aqueous solution comprising an amount of cobalt salt ($CoCl_2$) to be removed corresponding to 100 ppm (weight of cobalt per weight of solution) are brought into contact with an amount of Raney nickel (Acros) corresponding to 0.1 g/g of solution.

After reacting for 24 hours, the solid is removed from the solution by filtration.

The final concentration of $Co^{++}$ in the solution is then only 0.5 ppm (weight of cobalt per weight of solution).

EXAMPLE 5

10 g of an aqueous solution comprising an amount of cerium salt ($Ce(NO_3)_3$) to be removed corresponding to 4760 ppm (weight of cerium per weight of solution) are brought into contact with 1 g of a solid composed of nickel supported on alumina comprising 23% (by weight) of nickel.

After reacting for 24 hours, the solid is removed from the solution by filtration.

The final concentration of $Ce^{+++}$ in the solution is then only 1 ppm (weight of cerium per weight of solution).

EXAMPLE 6

10 g of an aqueous solution comprising an amount of lead salt ($Pb(NO_3)_2$) to be removed corresponding to 1760 ppm (weight of lead per weight of solution) are brought into contact with 1 g of a solid composed of nickel supported on alumina comprising 23% (by weight) of nickel.

After reacting for 24 hours, the solid is removed from the solution by filtration.

The final concentration of $Pb^{++}$ in the solution is then only 2 ppm (weight of lead per weight of solution).

EXAMPLE 7

10 g of an aqueous solution comprising an amount of chromium salt ($CrCl_3$) to be removed corresponding to 1000 ppm (weight of chromium per weight of solution) are brought into contact with an amount of Raney nickel (Acros) corresponding to 0.1 g/g of solution.

After reacting for 24 hours, the solid is removed from the solution by filtration.

The final concentration of $Cr^{+++}$ in the solution is then only 3 ppm (weight of chromium per weight of solution).

EXAMPLE 8

10 g of an aqueous solution comprising an amount of chromium salt ($Cr_2O_7^{2-}$) to be removed corresponding to 500 ppm (weight of chromium per weight of solution) are brought into contact with an amount of Raney nickel (Acros) corresponding to 0.1 g/g of solution.

After reacting for 24 hours, the final concentration of $Cr^{6+}$ in the solution is then only 3 ppm (weight of chromium per weight of solution).

The invention claimed is:

1. A process for removing metal ions from a contaminated solution containing metal ions, which comprises:
   contacting the contaminated solution with a solid comprising a reduced metal selected from the elements of Group VIII of the Periodic Table which is reduced using a chemical reducing agent or with hydrogen so as to chemisorb the metal ions; and
   separating the treated solution from the solid comprising the reduced metal.

2. The process according to claim 1, wherein the metal ions to be removed, are selected from the group consisting of zinc, lead, chromium, copper, iron, aluminum, manganese, cadmium, cerium, silver and mixtures thereof.

3. The process according to claim 1, wherein the reduced metal is in a colloidal form or on a support.

4. The process according to claim 1, wherein the reduced metal is reduced using a chemical reducing agent or with hydrogen between 100° C. and 600° C.

5. The process according to claim 1, wherein the reduced metal is nickel.

6. The process according to claim 1, wherein the reduced metal is Raney nickel.

7. The process according to claim 1, wherein the reduced metal is a mixture of two or more metals.

8. The process according to claim 1, wherein the reduced metal or a mixture of reduced metals is supported on a divided support.

9. The process according to claim 1, wherein the reduced metal or a mixture of reduced metals is supported on a support selected from the group consisting of silica, alumina, $TiO_2$, active charcoal, zeolites and mixtures thereof.

10. The process according to claim 1, wherein the contaminated solution is treated under a hydrogen pressure.

11. The process according to claim 10, wherein the hydrogen pressure is between 0 and 10 atmospheres.

12. The process according to claim 10, wherein the hydrogen pressure is between 0 and 1 atmosphere.

13. The process according to claim 1, wherein the contaminated solution is treated at a temperature of between 0° C. and 200° C.

14. The process according to claim 1, wherein the contaminated solution is treated at a temperature of between 0° C. and 80° C.

15. The process according to claim 1, wherein the treated solution is separated from the solid comprising the reduced metal by filtration.

16. A process for removing metal ions from a contaminated solution containing metal ions, which comprises:
   contacting the contaminated solution with a solid comprising a metal having a valency state equal to 0 and selected from the elements of Group VIII of the Periodic Table, which is treated with a chemical reducing agent or with hydrogen so as to obtain a reduced metal that chemisorbs the metal ions; and
   separating the treated solution from the solid comprising the reduced metal.

17. The process according to claim 16, wherein the reduced metal is a mixture of two or more metals.

18. The process according to claim 16, wherein the metal ions to be removed, are selected from the group consisting of zinc, lead, chromium, copper, iron, aluminum, manganese, cadmium, cerium, silver and mixtures thereof.

19. A process for removing metal ions from a contaminated solution containing metal ions, which comprises:
   contacting the contaminated solution with a solid comprising a reduced metal selected from the group consisting of Fe, Ni, Co, Cu, Pt, Pd, Rh, Ir, and combinations thereof, which is reduced using a chemical reducing agent or with hydrogen so as to chemisorb the metal ions; and
   separating the treated solution from the solid comprising the reduced metal.

20. The process according to claim 19, wherein the reduced metal is selected from the group consisting of Ni, Co, Cu, Pt, Pd, Rh, and Ir.

* * * * *

UNITED STATES PATENT AND TRADEMARK OFFICE
CERTIFICATE OF CORRECTION

PATENT NO. : 7,393,454 B2
APPLICATION NO. : 10/471843
DATED : July 1, 2008
INVENTOR(S) : Basset et al.

It is certified that error appears in the above-identified patent and that said Letters Patent is hereby corrected as shown below:

On the title page, please amend item (75) to read as follows:

Item --(75) Inventors: Jean-Marie Basset, Caluire (FR);
Jean-Pierre Candy, Caluire (FR);
Gregory Godard, Genilac (FR)--.

Signed and Sealed this

Twenty-third Day of September, 2008

JON W. DUDAS
*Director of the United States Patent and Trademark Office*